(12) United States Patent
Hidringer et al.

(10) Patent No.: US 10,570,970 B2
(45) Date of Patent: Feb. 25, 2020

(54) DISC BRAKE FOR A COMMERCIAL VEHICLE

(71) Applicant: KNORR-BREMSE Systeme fuer Nutzfahrzeuge GmbH, Munich (DE)

(72) Inventors: Michael Hidringer, Hofkirchen (DE); Thomas Beck, Passau (DE); Wolfgang Pritz, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 3 days.

(21) Appl. No.: 15/907,803

(22) Filed: Feb. 28, 2018

(65) Prior Publication Data

US 2018/0187729 A1    Jul. 5, 2018

Related U.S. Application Data

(63) Continuation of application No. PCT/EP2016/069209, filed on Aug. 12, 2016.

(30) Foreign Application Priority Data

Sep. 1, 2015 (DE) ........................ 10 2015 114 547

(51) Int. Cl.
*F16D 55/2255* (2006.01)
*F16D 65/56* (2006.01)
(Continued)

(52) U.S. Cl.
CPC ....... *F16D 55/2255* (2013.01); *F16D 65/567* (2013.01); *B60T 1/065* (2013.01); *F16D 65/0971* (2013.01)

(58) Field of Classification Search
CPC .... F16D 65/38; F16D 55/2255; F16D 65/567; F16D 65/0971; B60T 1/065
(Continued)

(56) References Cited

U.S. PATENT DOCUMENTS

| 4,683,659 A | 8/1987 | Wuensch et al. |
| 8,678,145 B2 | 3/2014 | Camilo-Martinez et al. |

(Continued)

FOREIGN PATENT DOCUMENTS

| CN | 1326058 A | 12/2001 |
| CN | 1388874 A | 1/2003 |

(Continued)

OTHER PUBLICATIONS

Chinese-language Office Action issued in counterpart Chinese Application No. 201680056769.2 dated Feb. 3, 2019 with English translation (11 pages).

(Continued)

*Primary Examiner* — Xuan Lan Nguyen
(74) *Attorney, Agent, or Firm* — Crowell & Moring LLP

(57) ABSTRACT

A disc brake for a vehicle, in particular for a commercial vehicle, includes a brake caliper, which extends over a brake disc; a brake application device arranged in the brake caliper for pressing brake pads against the brake disc; at least one brake piston, which can be moved axially by the brake application device; an adjustment device, which is positioned in the brake caliper and which is operatively connected, by a gearing, to the brake piston in order to axially adjust the brake piston in order to compensate a clearance change resulting from wear. The gearing has an input gear, which is retained on the adjustment device for conjoint rotation, and an output gear, which is retained on the brake piston for conjoint rotation. The disc brake is designed such that the output gear connected to the brake piston for conjoint rotation and the input gear of the adjustment device, which input gear corresponds thereto, are arranged in a driver device, which is held in an axially movable but rotationally fixed manner.

12 Claims, 4 Drawing Sheets

(51) Int. Cl.
*B60T 1/06* (2006.01)
*F16D 65/097* (2006.01)

(58) Field of Classification Search
USPC .................................. 188/71.7, 71.8, 196 R
See application file for complete search history.

(56) References Cited

U.S. PATENT DOCUMENTS

| | | |
|---|---|---|
| 2002/0017437 A1 | 2/2002 | Ortegren et al. |
| 2004/0026181 A1 | 2/2004 | Baumgartner et al. |
| 2005/0034935 A1 | 2/2005 | Maehara |
| 2005/0284709 A1 | 12/2005 | Sandberg |
| 2012/0261219 A1 | 10/2012 | Nakakura |
| 2014/0174862 A1* | 6/2014 | Gruber .................... B60T 1/065 188/71.9 |
| 2015/0184708 A1* | 7/2015 | Camilo-Martinez ... F16D 65/18 188/71.8 |

FOREIGN PATENT DOCUMENTS

| | | | | |
|---|---|---|---|---|
| CN | 1580602 A | 2/2005 | | |
| CN | 102745292 A | 10/2012 | | |
| DE | 10 2008 036 765 A1 | 2/2010 | | |
| DE | 10 2009 018 223 A1 | 11/2010 | | |
| DE | 102010026076 A1 * | 1/2012 | ........... | F16D 55/226 |
| DE | 10 2011 110 055 A1 | 2/2013 | | |
| DE | 10 2012 006 097 A1 | 9/2013 | | |
| DE | 10 2012 006 112 A1 | 10/2013 | | |
| DE | 10 2012 012 818 A1 | 1/2014 | | |
| DE | 11 2013 003 793 T5 | 4/2015 | | |
| EP | 2679854 A1 * | 1/2014 | ........... | F16D 55/226 |
| EP | 2 151 597 B1 | 3/2014 | | |
| JP | 62-28201 A | 2/1987 | | |
| JP | 2014-9692 A | 1/2014 | | |
| JP | 2015-523526 A | 8/2015 | | |
| RU | 2 265 144 C1 | 11/2005 | | |
| RU | 2 328 635 C2 | 7/2008 | | |
| WO | WO 2013/143988 | 10/2013 | | |
| WO | WO-2016037934 A1 * | 3/2016 | ........... | F16D 55/226 |

OTHER PUBLICATIONS

Russian-language Office Action issued in counterpart Russian Application No. 2018111068/11 (017113) dated Dec. 28, 2018 with English translation (12 pages).
International Search Report (PCT/ISA/210) issued in PCT Application No. PCT/EP2016/069209 dated Oct. 18, 2016 with English translation (five pages).
German-language Written Opinion (PCT/ISA/237) issued in PCT Application No. PCT/EP2016/069209 dated Oct. 18, 2016 (five pages).
German-language Office Action issued in counterpart German Application No. 10 2015 114 547.2 dated Jul. 1, 2016 (six pages).
International Preliminary Report on Patentability (PCT/IB/326 & PCT/IB/373) issued in PCT Application No. PCT/EP2016/069209 dated Mar. 15, 2018, including English translation of document C2 (German-language Written Opinion (PCT/ISA/237) previously filed on Feb. 28, 2018) (seven (7) pages).
Japanese-language Office Action issued in counterpart Japanese Application No. 2018-529721 dated Apr. 1, 2019 with English translation (12 pages).

* cited by examiner

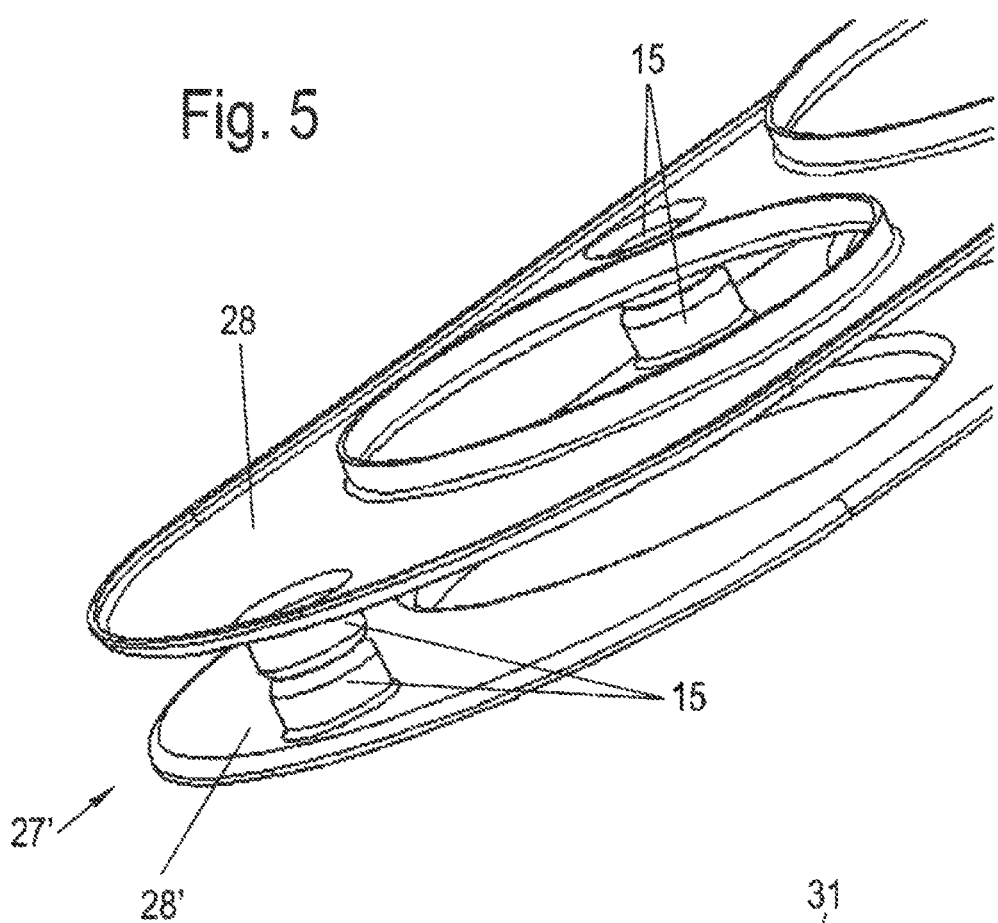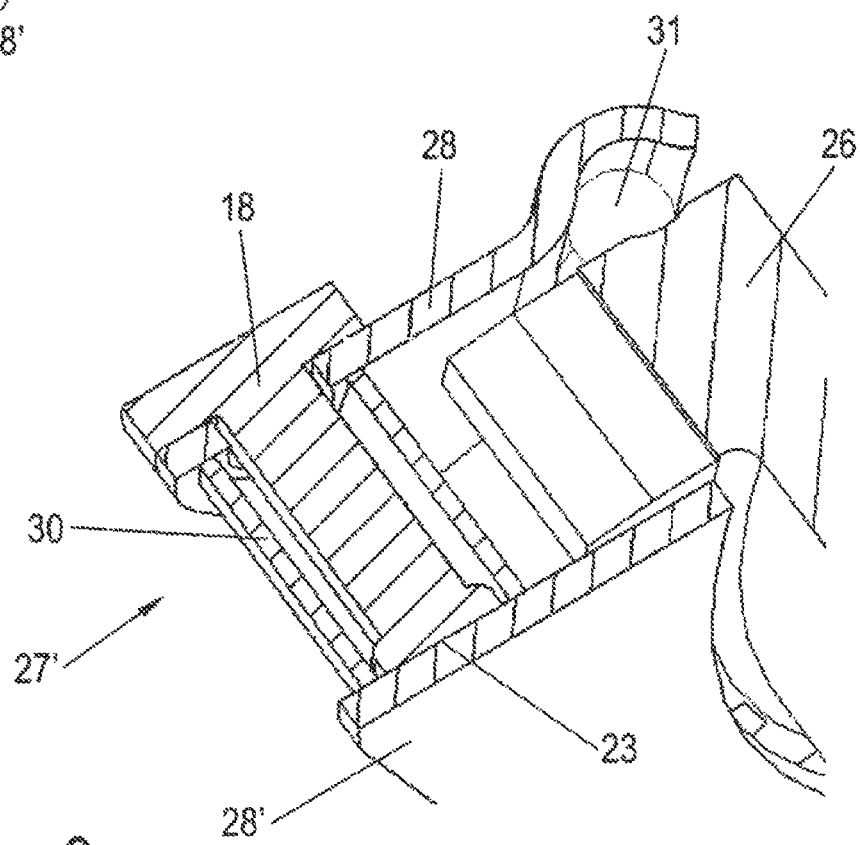

DISC BRAKE FOR A COMMERCIAL VEHICLE

CROSS REFERENCE TO RELATED APPLICATIONS

This application is a continuation of PCT International Application No. PCT/EP2016/069209, filed Aug. 12, 2016, which claims priority under 35 U.S.C. § 119 from German Patent Application No. 10 2015 114 547.2, filed Sep. 1, 2015, the entire disclosures of which are herein expressly incorporated by reference.

BACKGROUND AND SUMMARY OF THE INVENTION

The invention relates to a disc brake for a commercial vehicle.

DE 10 2008 036 765 A1 and DE 10 2009 018 223 A1 each disclose a disc brake, in which a rotationally fixed actuating spindle of a brake plunger forms a nut part which is guided on a threaded spindle which can be rotated relative to it, the internal thread of the actuating spindle and the external thread of the threaded spindle forming a thread pairing.

In order to compensate for a wear-induced change of an air play, that is to say the spacing between the brake application-side brake pad and a vehicle-side brake disc, the threaded spindle is rotated with respect to the actuating spindle which is held in a rotationally fixed manner, by way of an adjusting device which is arranged in the brake caliper.

To this end, the adjusting device has a drive gear which is connected in a rotationally fixed and axially secured manner to a drive spindle of the adjusting device and which is operatively connected to an output gear which is held in a rotationally fixed manner on the threaded spindle.

In the case of said known disc brakes, in each case two brake plungers which are arranged in parallel and at a spacing from one another are provided. These brake plungers can be driven for air play compensation via the adjusting device which is arranged centrally, that is to say between the two brake plungers, in order to compensate for the air play. Each actuating spindle is assigned an output gear, which output gears are a constituent part of a gearwheel mechanism of the adjusting device.

DE 10 2012 012 818 A1 discloses a comparable disc brake which, however, has merely one centrally arranged brake plunger, the actuating spindle of which is configured as a threaded sleeve, with an internal thread which is in engagement with a threaded spindle which can be rotated with respect to it and on the output gear of which in turn the drive gear (held in an axially secured manner) of the adjusting device, which is arranged laterally with respect to it, acts.

In addition to the gearwheel mechanisms which are known from the cited prior art, another gear mechanism can also be used to transmit the rotation of the adjusting device to the brake plunger or brake plungers, for example a flexible drive.

In the case of a braking operation, that is to say upon actuation of the brake lever, the brake plunger is displaced axially in the direction of the brake pad, including the output gear which is held in a rotationally fixed manner on the threaded spindle and, as has been mentioned, is operatively connected to the drive gear of the adjuster which, however, is positioned in an axially fixed manner. That is to say, the drive gear and the output gear perform a relative movement with respect to one another in the axial direction. This leads, however, to a considerable mechanical loading, by way of which the service life of the brake system is impaired.

The invention is based on the object of developing a disc brake of the abovementioned type in such a way that its functionality is improved and the service life is increased.

This object is achieved by way of a disc brake for a vehicle, in particular for a commercial vehicle, comprising: a brake caliper which straddles a brake disc; a brake application device which is arranged in the brake caliper for pressing brake pads onto the brake disc; at least one brake plunger which can be displaced axially by the brake application device; an adjusting device which is positioned in the brake caliper and is operatively connected via a gear mechanism to the brake plunger in order to adjust it axially in order to compensate for a wear-induced change in an air play, wherein the gear mechanism has a drive gear which is held on the adjusting device in a rotationally fixed manner and an output gear which is held on the brake plunger in a rotationally fixed manner. The output gear which is connected to the brake plunger in a rotationally fixed manner and the drive gear of the adjusting device, which drive gear corresponds with said output gear, are arranged in a driver device which is held such that it can be displaced axially but cannot be rotated.

In accordance with the invention, the drive gear of the adjusting device is mounted namely in a rotationally fixed manner, but such that it can be displaced axially, to be precise both in the brake application direction, that is to say in the braking direction, and in the release direction.

The mechanical loads which have been suffered up to now are avoided by way of the invention, according to which a driver device is provided, by way of which the two gear mechanism wheels which are operatively connected are coupled to one another in such a way that the braking-induced axial movement of the brake plunger is transmitted to the drive gear of the adjusting device.

This naturally results in an increase in the service life of the disc brake overall, with considerably reduced operating costs as a consequence which result firstly from the repair of the disc brake, including its spare parts supply, and secondly from the downtime of the commercial vehicle during the repair work.

Moreover, the operating or functional reliability of the disc brake is also improved by way of the invention, since the adjusting device is then functionally reliable as it were over the entire service life of the brake pads, that is to say up to their wear-induced replacement.

The driver device can be of very different design in structural terms, it being essential that the gear mechanism wheels which are operatively connected to one another are connected to one another in such a way that they remain freely rotatable.

To this end, coupling members are provided which, according to one preferred embodiment of the invention, consist of two plates which are in parallel and at a spacing from one another, preferably consist of sheet metal, and between which the gear mechanism wheels, for example gearwheels, but likewise also chain sprockets, are positioned.

Here, said two plates are connected to one another and are held at a spacing by way of suitable means such as beads, spacer sleeves or the like, which spacing is designed substantially in accordance with the thickness of the gear mechanism wheels. It goes without saying that other refinements of the coupling members are also contemplated.

As has been mentioned, the invention can be realized both in a disc brake with merely one brake plunger and also in a disc brake with two brake plungers. The brake plunger is arranged centrally with a laterally positioned adjusting device in the case of the former, whereas, in the case of a disc brake with two brake plungers, the adjusting device is arranged between them.

Here, the gear mechanism wheels bear against the two plates, preferably indirectly, with the involvement of sliding rings, on which the gear mechanism wheels are supported and which consist of a material which has a low coefficient of friction in correspondence with the gear mechanism wheel.

The sliding rings can be embedded into the plates or into the gear mechanism wheels themselves. The sliding ring assumes the form of a torus, with the result that there is a small contact area with the component which can be rotated relative to it.

Otherwise, the driver device can be manufactured very inexpensively, since the plates which substantially form the driver device are configured as simple punched sheet metal parts, into which the abovementioned beads can be formed at the same time as spacer elements. The beads protrude into the intermediate space which is formed by way of the two plates which are arranged at a spacing from one another, and bear against one another in such a way that they can be connected to one another, for example, by way of welding.

The spacer sleeves which are mentioned as spacer elements are likewise simple and inexpensive to manufacture, in particular as pipe sections.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a part of a detail of the disc brake in a perspective view.

FIG. 6 shows a further part of the disc brake in a sectioned view, likewise illustrated diagrammatically.

DETAILED DESCRIPTION OF THE DRAWINGS

Figure 1:
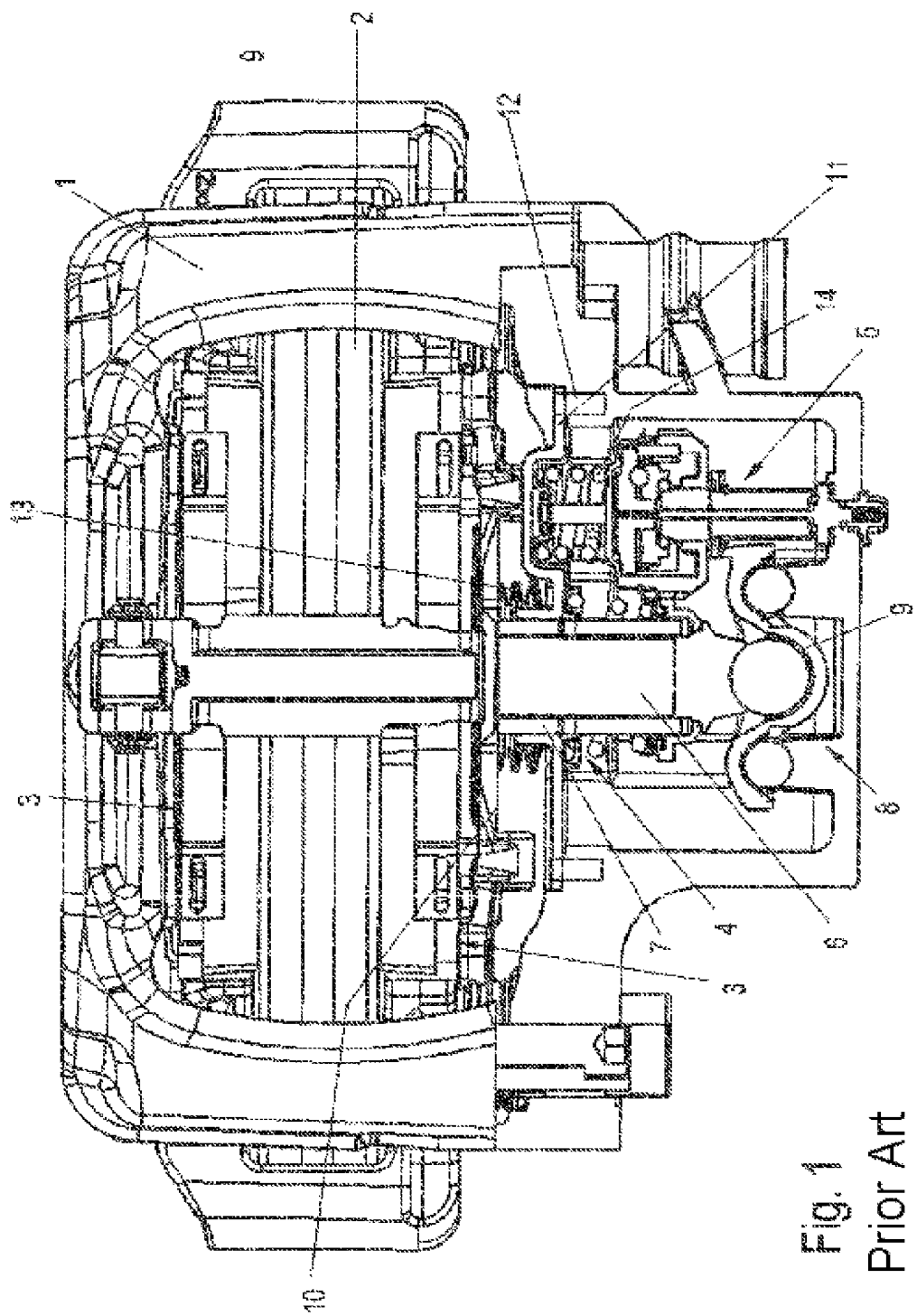
FIG. 1 shows a disc brake according to the prior art in a partially sectioned plan view.

FIG. 1 shows a diagrammatic view of a disc brake according to the prior art, having a brake caliper 1 which straddles over a brake disc 2, is configured as a sliding caliper, and in which two brake pads 3 are arranged. The brake pads are pressed against the brake disc 2 during operation, that is to say during a braking operation.

Here, first of all, the brake application-side brake pad 3 is pressed against the brake disc 2 by way of a brake application device 8, whereas subsequently, on account of the reaction forces, the reaction-side brake pad 3 is pressed against the brake disc 2 by way of driving of the brake caliper 1 which is displaced.

The brake application device has a central brake plunger 4 which can be pressed against the brake application-side brake pad 3 in an axially displaceable manner via a brake lever 9.

The brake plunger 4 consists of a rotatable threaded spindle 6 and a threaded sleeve 7 which is held such that it cannot rotate and the internal thread of which engages into the external thread of the threaded spindle 6. On the side which faces the associated brake pad 3, a plate-shaped pressure piece 10 is fastened to the threaded sleeve 7, which pressure piece 10 bears against the brake pad 3 in the braking case and is otherwise held in a positively locking manner on the threaded sleeve 7 in order to secure the latter against rotation.

An adjusting device 5 is connected to the threaded spindle 6 in order to compensate for an air play which changes in a wear-induced manner, that is to say the spacing or gap between the brake pad 3 and the brake disc 2.

In order to protect a receiving chamber of the brake caliper 1, which receiving chamber receives the brake application device 8 and the adjusting device 5, an assembly opening of the brake caliper 1 on the side which faces the brake disc 2 is closed by way of a closure plate 11. The closure plate 11 is connected to the brake caliper 1 by way of bolts 12.

The brake plunger 4 passes through the closure plate 11, whereas the adjusting device 5 is supported on the closure plate 11 in a manner which is loaded by way of a compression spring 14.

The passage region of the brake plunger 4 is sealed by way of a bellows 13, which bears sealingly on one side against the closure plate 11 and on the other side against the pressure piece 10 and/or against the brake plunger 4.

The brake lever 9 is supported pivotably on the brake plunger 4 via a ball as an intermediate element, just as it is supported on the brake caliper 1 via balls (not labelled).

Figure 2:
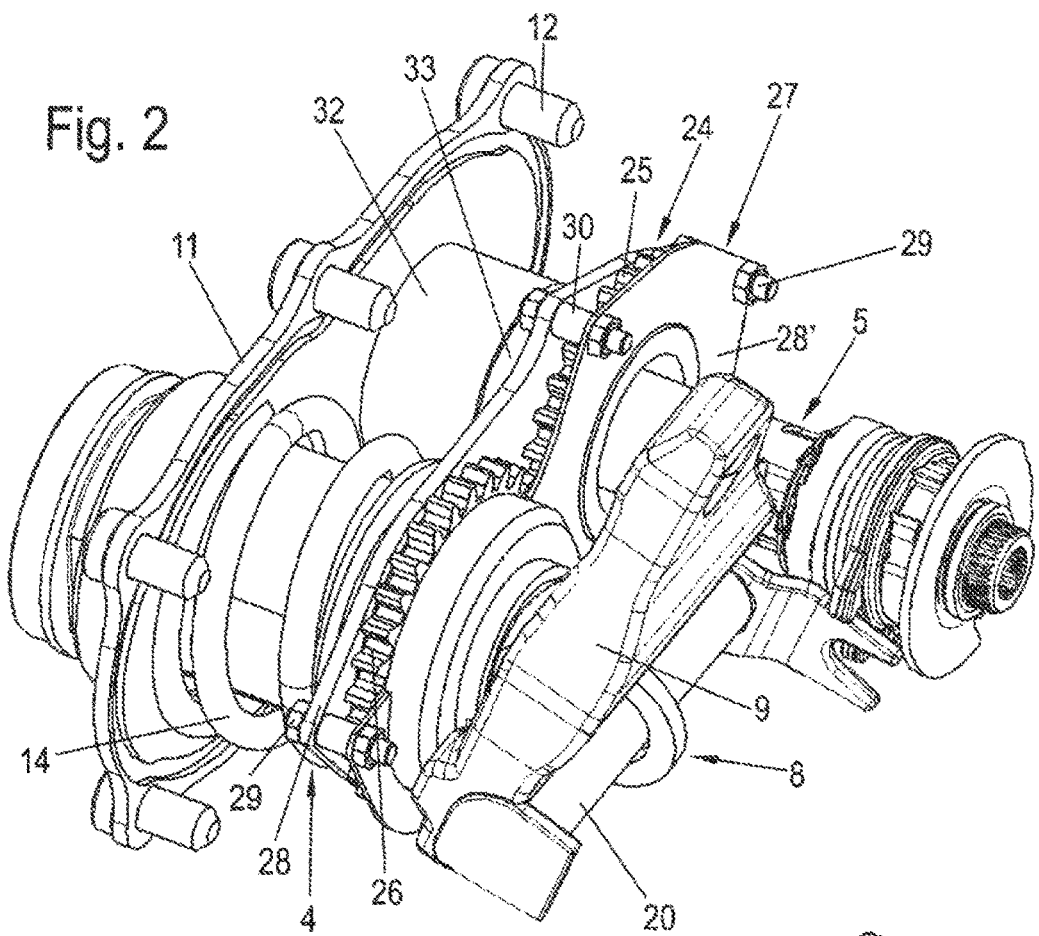
FIG. 2 shows a brake application and adjusting device as a detail in a perspective view.

FIG. 2 depicts a detail of the brake application device 8 and the adjusting device 5 which is arranged next to it and the functional configuration of which corresponds to FIG. 1 which reproduces the prior art. That is to say, a central brake plunger 4 is provided here, with the adjusting device 5 which is arranged adjacently with respect to it and by way of which a drive gear 25 of a gearwheel mechanism 24 can be driven. The drive gear 25 is configured as a gearwheel and is connected such that it cannot freely rotate.

In order to transmit the rotational movement for the purpose of air gap compensation, the drive gear 25 is in engagement with an output gear 26, which is likewise configured as a gearwheel and is connected to the threaded spindle 6 such that it cannot rotate. The result is that, in the case of a rotation of the output gear 26 and therefore the threaded spindle 6, the threaded sleeve 7 which is guided thereon is adjusted axially.

Figure 3:
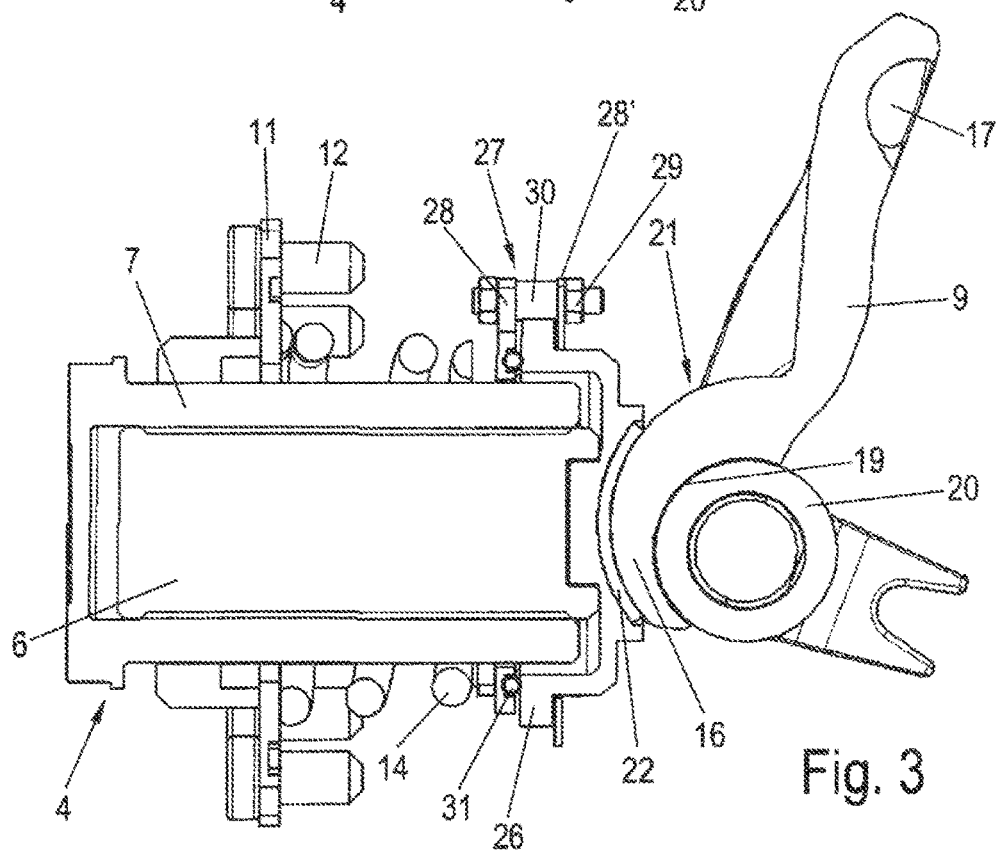
FIG. 3 shows the brake application device according to FIG. 2 in a diagrammatically sectioned side view.
Figure 4:
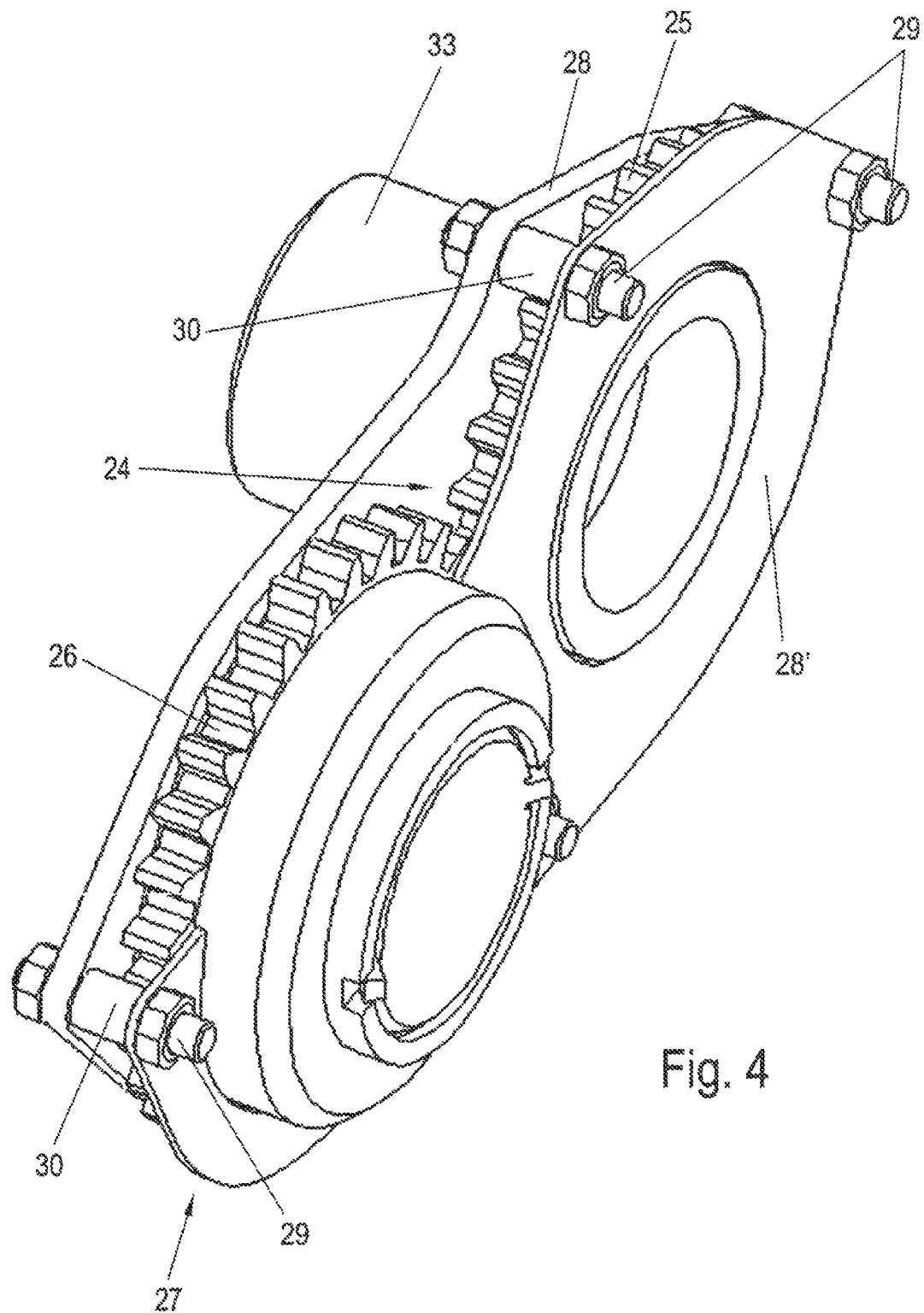
FIG. 4 shows a detail of the brake application device according to FIG. 2, likewise in a perspective illustration.

The arrangement of the output gear 26 can also be seen in FIGS. 3 and 4.

In the example which is shown in FIG. 3, a convex section 21 of the brake lever 9 is supported on the output gear 26 via a bearing shell 22, to which end it has a closed bottom in the form of a spur gear.

It is also contemplated, however, for the convex section 21 of the brake lever 9 to bear against the facing end side of the threaded spindle 6.

It can be seen in FIGS. 2-4 that the drive gear 25 and the output gear 26 of the gear mechanism 24 are positioned according to the invention in a driver device 27 which is formed from two plates 28, 28' as coupling members which are arranged in parallel and at a spacing from one another.

The latter are in turn connected to one another by way of bolts 29, on which spacer sleeves 30 are guided which are supported with their end sides on the mutually facing inner faces of the plates 28, 28'. This results in an intermediate space for receiving the gear mechanism 24.

FIGS. 5 and 6 in each case show further examples as to how an intermediate space for receiving the gear mechanism 24 can be formed.

FIG. 5 shows beads 15 which are directed toward one another, are pressed into the plates 28, 28' which lie opposite one another, and bear against one another in a pin-shaped manner with their mutually facing end faces and, for example, are welded to one another.

In FIG. 6, a pin 18 is guided through the plate 28, which pin is supported on one side with a head on the outer side of the plate 28 and bears on the other side against the inner side of the plate 28' and forms a welded point 23 there which results from arc welding with the plate 28', by way of which arc welding the plates 28, 28' are connected to one another. In accordance with the exemplary embodiment according to FIG. 4, the spacing for forming the intermediate space between the two plates 28, 28' is achieved by way of a spacer sleeve 30, through which the pin 18 is plugged.

In the case of pivoting of the brake lever 9 in order to apply the brake, the brake plunger 4 is displaced axially in the direction of the brake pad 3 (FIG. 1) via an eccentric 16, with driving of the output gear 26. At the same time, the drive gear 25 of the adjusting device 5 is also driven by way of the driver device 27, to which end the drive gear 25 is held on the adjusting device 5 namely in a rotationally fixed manner, but such that it can be displaced axially.

Since the drive gear 25 and the output gear 26 rotate during operation with respect to the plates 28, 28', sliding rings 31 are provided in order to reduce a frictional resistance between the drive gear and the output gear 25, 26 and the plates 28, 28', as can be seen clearly in FIG. 3. In the present example, said sliding ring is embedded into the plate 28 with a small projecting length into the intermediate space which is formed. The result is that the drive gear 25 and the output gear 26 are held without play with respect to the plate 28.

The resetting of the brake plunger 4 and therefore also of the output gear 26 after the brake is released takes place by way of the compression spring 14 which is supported on one side on the closure cover 11 and on the other side on the associated plate 28 and is guided on the brake plunger 4.

As can be seen particularly clearly in FIG. 4, the plate 28' which faces the brake lever 9 bears against the output gear 26 merely in regions, while it encloses a receiving sleeve 33.

The drive gear 25 is held on said receiving sleeve 33 such that it is secured both axially and circumferentially, and is connected to the adjusting device 5 in such a way that an axial displacement is possible, but at the same time there is a support against rotation. The receiving sleeve 33 and the drive gear 25 can be configured as one component or as two separate components.

Here, the receiving sleeve 33 dips into a guide sleeve 32 (FIG. 2) which is fastened to the closure plate 11, at the same time forms a support for the adjusting device, and can be displaced axially with respect to the receiving sleeve 33, in the case of an axial adjustment of the brake plunger 4.

In contrast to the brake application device of the prior art and seen in FIG. 1, the brake application device 8 which is depicted in FIGS. 2 and 3 has a brake lever 9 which is not supported by way of a bearing ball on the brake plunger 4, and is likewise not supported via bearing balls on the brake caliper head.

Instead, a groove 19 is configured in the brake lever 9 on that side which lies opposite the eccentric 16, in which groove 19 an anti-friction roller 20 lies which is supported on a supporting point which is provided on the caliper head of the brake caliper 1 and can be a bearing point. Here, the anti-friction roller 20 is preferably configured as a pivoting bearing for the brake lever 9, which can be seen particularly clearly in FIG. 3.

LIST OF DESIGNATIONS

1 Brake caliper
2 Brake disc
3 Brake lining
4 Brake plunger
5 Adjusting device
6 Threaded spindle
7 Threaded sleeve
8 Brake application device
9 Brake lever
10 Pressure piece
11 Closure plate
12 Bolt
13 Bellows (gaiter)
14 Compression spring
15 Bead
16 Eccentric
17 Depression
18 Pin
19 Groove
20 Anti-friction roller
21 Section
22 Bearing shell
23 Welded point
24 Gear mechanism
25 Drive gear
26 Output gear
27 Driver device
28 Plate
28' Plate
29 Bolt
30 Spacer sleeve
31 Sliding ring
32 Guide sleeve
33 Receiving sleeve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a vehicle, comprising:
   a brake caliper which straddles a brake disc;
   a brake application device which is arranged in the brake caliper for pressing brake pads onto the brake disc;
   at least one brake plunger which is axially displaceable by the brake application device;
   an adjusting device which is positioned in the brake caliper and is operatively connected via a gear mechanism to the brake plunger in order to adjust it axially in order to compensate for a wear-induced change in an air play, wherein
   the gear mechanism has a drive gear which is held on the adjusting device in a rotationally fixed manner and an output gear which is held on the brake plunger in a rotationally fixed manner, and
   the output gear which is connected to the brake plunger in a rotationally fixed manner and the drive gear of the adjusting device, which drive gear corresponds with said output gear, are arranged in a driver device which is held such that it is axially displaceable but not rotatable.

2. The disc brake as claimed in claim 1, wherein the driver device is fastened to the brake plunger and/or the adjusting device.

3. The disc brake as claimed in claim 1, wherein the driver device is held in an axially secured manner on a receiving sleeve of the adjusting device, which receiving sleeve supports the drive gear and is held in the driver device so as to rotate.

4. The disc brake as claimed in claim 1, wherein the driver device comprises two coupling members which are arranged at a spacing from one another and are connected to one another.

5. The disc brake as claimed in claim 4, wherein the coupling members are plates which are arranged in parallel and at a spacing from one another, wherein an intermediate space is formed which receives the drive gear and the output gear.

6. The disc brake as claimed in claim 5, wherein the plates are connected to one another by way of bolts, spacer sleeves are guided on said bolts, and end sides of said spacer sleeves are supported in each case on an inner face of the plates.

7. The disc brake as claimed in claim 5, wherein beads, which are connected to one another, are provided in at least one plate.

8. The disc brake as claimed in claim 7, wherein the beads are provided in both plates.

9. The disc brake as claimed in claim 6, wherein the plates are connected to one another by way of a pin, on which the spacer sleeve is guided, and which pin is connected to at least one plate by arc welding.

10. The disc brake as claimed in claim 1, wherein the drive gear and/or the output gear bear in each case against at least one sliding ring.

11. The disc brake as claimed in claim 5, wherein the sliding ring is embedded into one of the plates.

12. The disc brake as claimed in claim 10, wherein a friction pairing which is formed from the sliding ring and the drive gear and/or the output gear has a low coefficient of friction.

* * * * *